United States Patent [19]
Oostendorp

[11] Patent Number: 5,649,413
[45] Date of Patent: Jul. 22, 1997

[54] GRASS TRIMMING AND LAWN EDGING DEVICE

[76] Inventor: William E. Oostendorp, 3007 57th St. East, Bradenton, Fla. 34208

[21] Appl. No.: 557,502

[22] Filed: Nov. 14, 1995

[51] Int. Cl.⁶ .................................................. A01D 55/00
[52] U.S. Cl. ............................ 56/12.7; 56/17.5; 172/15
[58] Field of Search ......................... 56/12.7, 256, 295, 56/255, 12.1, 17.5, DIG. 17, DIG. 20; 30/276; 172/15, 17

[56] References Cited

U.S. PATENT DOCUMENTS

| | | |
|---|---|---|
| 2,718,742 | 9/1955 | Tangeman .................... 56/256 |
| 2,850,862 | 9/1958 | Asbury . |
| 3,006,421 | 10/1961 | Feilbach ....................... 56/256 |
| 3,656,554 | 4/1972 | Buhner . |
| 3,918,241 | 11/1975 | Stillions . |
| 4,062,114 | 12/1977 | Luick ........................ 56/12.7 X |
| 4,095,338 | 6/1978 | Naohiko et al. . |
| 4,118,865 | 10/1978 | Jacyno et al. . |
| 4,137,694 | 2/1979 | Hopper . |
| 4,148,141 | 4/1979 | Hoff . |
| 4,170,099 | 10/1979 | Owens ...................... 56/12.7 X |
| 4,177,561 | 12/1979 | Ballas . |
| 4,202,094 | 5/1980 | Kalmar ..................... 56/12.7 X |
| 4,223,441 | 9/1980 | Everts . |
| 4,290,257 | 9/1981 | Frantello . |
| 4,295,324 | 10/1981 | Frantello et al. . |
| 4,367,587 | 1/1983 | Kilmer . |
| 4,479,302 | 10/1984 | Richter . |
| 4,856,194 | 8/1989 | Lee ......................... 56/12.7 X |
| 4,860,525 | 8/1989 | Chee . |
| 4,894,914 | 1/1990 | Mead . |
| 4,936,884 | 6/1990 | Campbell ..................... 56/255 X |
| 4,962,630 | 10/1990 | Jones ......................... 56/12.7 |
| 4,996,828 | 3/1991 | Jetzinger ...................... 56/12.7 |
| 5,115,870 | 5/1992 | Byrnes ....................... 56/12.7 X |
| 5,174,100 | 12/1992 | Wassenberg . |
| 5,239,811 | 8/1993 | Spearman .................... 56/12.7 X |
| 5,271,212 | 12/1993 | Anderson ..................... 56/12.7 |
| 5,423,126 | 6/1995 | Byrne ........................ 56/12.7 X |
| 5,479,763 | 1/1996 | Coble ......................... 56/295 X |
| 5,491,962 | 2/1996 | Sutliff et al. ................. 56/295 X |
| 5,493,783 | 2/1996 | Oostendorp ..................... 30/276 |

*Primary Examiner*—Terry Lee Melius
*Assistant Examiner*—Victor Batson
*Attorney, Agent, or Firm*—Charles J. Prescott

[57] ABSTRACT

A combination grass trimming and lawn edging device operatively connectable to the rotary output shaft of a power lawn trimmer. The device includes a support member which defines a preferably circular perimeter and includes a central mounting hole for operable driven connection with the output shaft. Two independent cutting means are provided, the first being a plurality of evenly spaced rigid blades which are each pivotally connected to the support member and, when operable with the output shaft being generally horizontal, radially extend beyond the perimeter for lawn edging. Another plurality of elongated flexible filament lines are each operably connectable by engagement with one end of each thereof with evenly spaced aperture structure of the support member to provide the second cutting means. When in use with the output shaft upright, the filament lines are for cutting and trimming grass. The rigid blades are retractable when not in use, while the filament lines are easily removable when the rigid blades are in use for lawn edging.

5 Claims, 4 Drawing Sheets

5,649,413

GRASS TRIMMING AND LAWN EDGING DEVICE

BACKGROUND OF THE INVENTION

1. Scope of Invention

This invention relates generally to lawn trimming and edging devices, and more particularly to a combination grass trimming and lawn edging device for connection to a rotary output shaft of a power lawn trimmer.

2. Prior Art

Grass trimming devices are well known. These are generally in the form of "WEEDEATER" type lawn trimmer devices which include one or a plurality of elongated flexible filament line connected to and radially extending from a central hub of a power trimmer. The hub is rotated at sufficiently high r.p.m. to enable each of the filament lines to slice through grass and other like vegetation. These power trimmers are generally utilized with the output shaft being in an upright orientation.

The following U.S. patents are each generally directed to a lawn or grass trimming device associated with the use of a rotating flexible filament line:

| Naohiko, et al. | 4,095,338 |
| Jacyno, et al. | 4,118,865 |
| Hopper | 4,137,694 |
| Hoff | 4,148,141 |
| Ballas | 4,177,561 |
| Everts | 4,223,441 |
| Frantello | 4,290,257 |
| Frantello, et al. | 4,295,324 |
| Kilmer | 4,367,587 |

Another commonly available lawn manicuring aid is in the form of a lawn edger. These lawn edgers include a power driven output shaft generally horizontally oriented to which a rotating blade assembly is attached. The blades are typically rigid in nature and may be pivotally connected to a central support member to reduce the likelihood of damage upon impact with sidewalks, curbs, streets and stones within the lawn.

A number of U.S. patents are likewise directed to lawn edging devices having rigid rotating blades, some of which have pivotally connected end blade portions for safety purposes as follows:

| Asbury | 2,850,862 |
| Buhner | 3,656,554 |
| Stallions | 3,918,241 |
| Richter | 4,479,302 |
| Chee | 4,860,525 |

U.S. Pat. No. 4,894,914 invented by Mead is directed to a grass trimming device capable of operating in at least two alternate configurations, one for cutting in a horizontal plane as in grass trimming, and the other for operating in a vertical plane for lawn edging. This device teaches the utilization of both pivotally connected rigid blades for upright edging and horizontal trimming, along with a separate head for lawn trimming utilizing a single endless filament line. However, separate rotating head members are required for each alternate cutting member.

Wassenberg, in U.S. Pat. No. 5,174,100 teaches a combination mower and trimmer apparatus for use in conjunction with a rotary mower having an upright rotating output shaft.

The present invention provides a combination grass trimmer and lawn edger device for connection to the rotatable output shaft of a conventional power lawn trimmer. Rigid pivotally connected blades may be placed in operable position for lawn edging and then manually retracted when the device is used in conjunction with the horizontal orientation in which a plurality of flexible filament lines are rotated in operable position for grass trimming.

BRIEF SUMMARY OF THE INVENTION

This invention is directed to a combination grass trimming and lawn edging device operatively connectable to the rotary output shaft of a power lawn trimmer. The device includes a support member which defines a preferably circular perimeter and includes a central mounting hole for operable driven connection with the output shaft. Two independent cutting means are provided, the first being a plurality of evenly spaced rigid blades which are each pivotally connected to the support member and, when operable with the output shaft being generally horizontal, radially extend beyond the perimeter for lawn edging. Another plurality of elongated flexible filament lines are each operably connectable by engagement with one end of each thereof with evenly spaced aperture structure of the support member to provide the second cutting means. When in use with the output shaft upright, the filament lines are for cutting and trimming grass. The rigid blades are retractable when not in use, while the filament lines are easily removable when the rigid blades are in use for lawn edging.

It is therefore an object of this invention to provide a combination grass trimming and lawn edging device in a single unit which is connectable to the rotatable output shaft of a power lawn trimmer.

It is another object of this invention to provide a combination grass trimming and lawn edging device which facilitates the easy storage or removal of one of the two cutting elements not in use.

It is yet another object of this invention to provide a combination grass trimming and lawn edging device operable connectable to virtually any power lawn trimmer and having optimal strength and impact resistance features.

It is still another object of this invention to provide a combination grass trimming and lawn edging device which facilitates secure storage of the rigid blades utilized for lawn edging when the device is used for grass trimming.

In accordance with these and other objects which will become apparent hereinafter, the instant invention will now be described with reference to the accompanying drawings.

DETAILED DESCRIPTION OF THE INVENTION

Figure 1:
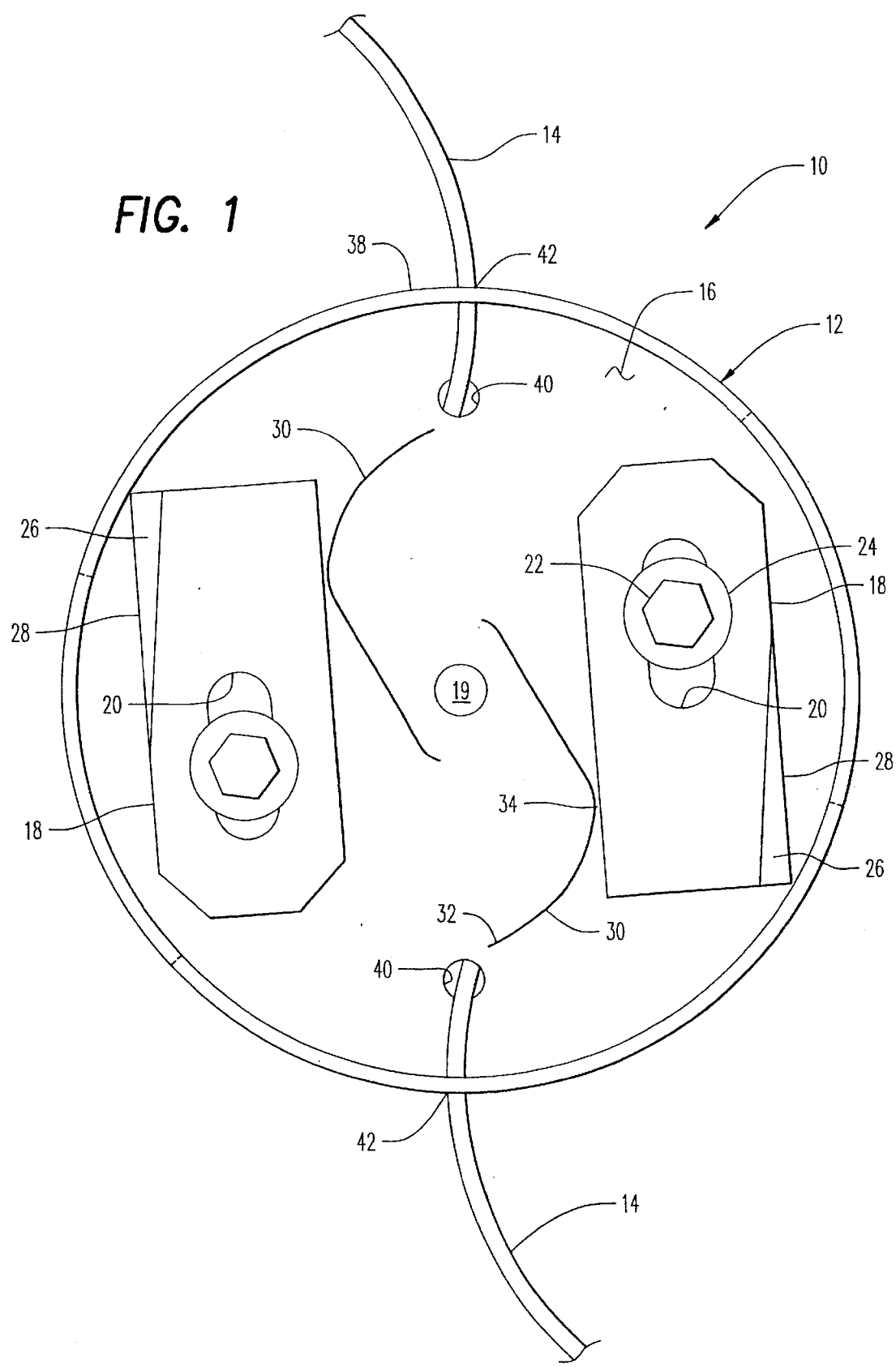
FIG. 1 is a bottom plan view of the invention showing the rigid blades (18) in a stored configuration and the flexible filament lines (14) in operable grass cutting position.

Referring now to the drawings, one embodiment of the invention is shown generally at numeral 10 in FIG. 1. The invention 10 includes a support member 12, pivotally connected blades 18 and flexible elongated filament line members 14.

The support member 12 is formed of rigid high-strength steel having a circular plate 16 and a cylindrical protective ring 38 dependently connected in continuous fashion around the entire circular perimeter of plate 16. A central mounting hole 19 is provided which facilitates mounting and driven engagement onto a rotatable output shaft of a power lawn trimmer (not shown).

The pair or other useful plurality of rigid blades 18 are pivotally held through slot 20 by threaded fastener 22 against flat washer 24 to internally threaded collar 54 rigidly connected to an aligned hole formed through plate 16. The threaded collars 54 are evenly spaced both radially and angularly one to another for proper weight distribution and balance when rotated. Each rigid blade 18 includes a diagonal chamfer 26 defining a cutting edge 28.

Figure 2:
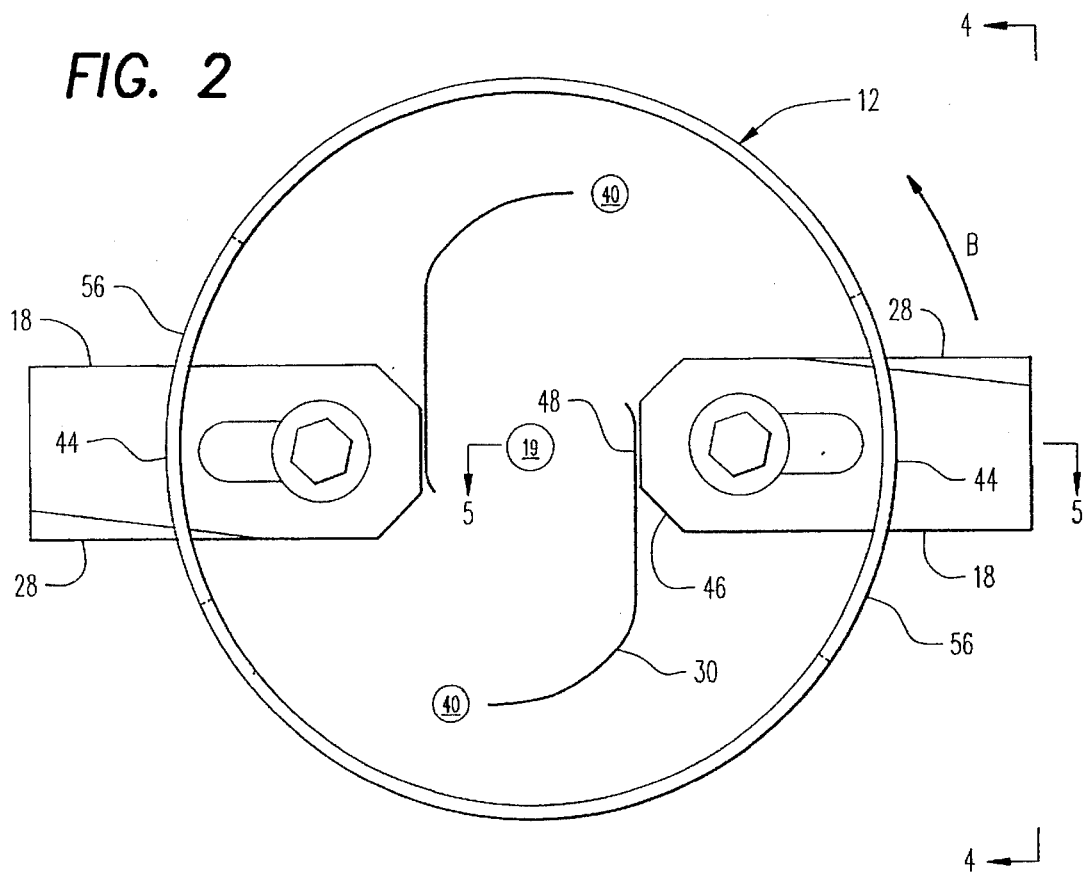
FIG. 2 is a view similar to FIG. 1 showing the rigid blades (18) pivoted to an in-use operable orientation and the flexible filament lines (14) element removed.

The slots 20 are elongated, in conjunction with the selected diameter of threaded fasteners 22, so that each blade 18 may be moved inwardly and rotated about bolt 22 from the in-use position shown in FIG. 2, wherein the support member 12 rotates in the direction of arrow B, to a stored non-use position shown in FIG. 1 wherein the blades 18 are positioned fully within ring 28 and the circular perimeter of disc 16.

A flat spring 30 rigidly connected to the plate 16 at 32 serves as a biasing member to retain each rigid blade 18 in the stored position shown in FIG. 1 by contact at 34 and in the in-use or operable position by contact of the biasing spring 30 at 48. Movement is aided by beveled corners 46. Slots 56 are formed into the protective ring 38 to facilitate back and forth positioning of each blade 18 between its stored and its in-use position.

Figure 5:
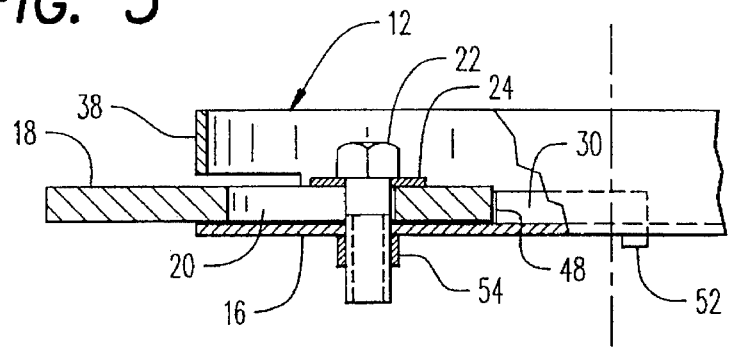
FIG. 5 is a section view in the direction of arrows 5—5 in FIG. 2.

When the device is in its orientation shown in FIGS. 2 and 5 with the blades 18 in operable position, the axis of the output shaft of the power lawn trimmer may be oriented horizontally with the device 10 attached thereto for lawn edging by rotation in the direction of arrow B. Should either of the blades 18 strike a solid object such as either a concrete lawn boarder, curb, sidewalk, or rocks or stones within the lawn, the blades 18 will pivotally deflect rearwardly to avoid or reduce damage and severity of impact.

Figure 3:
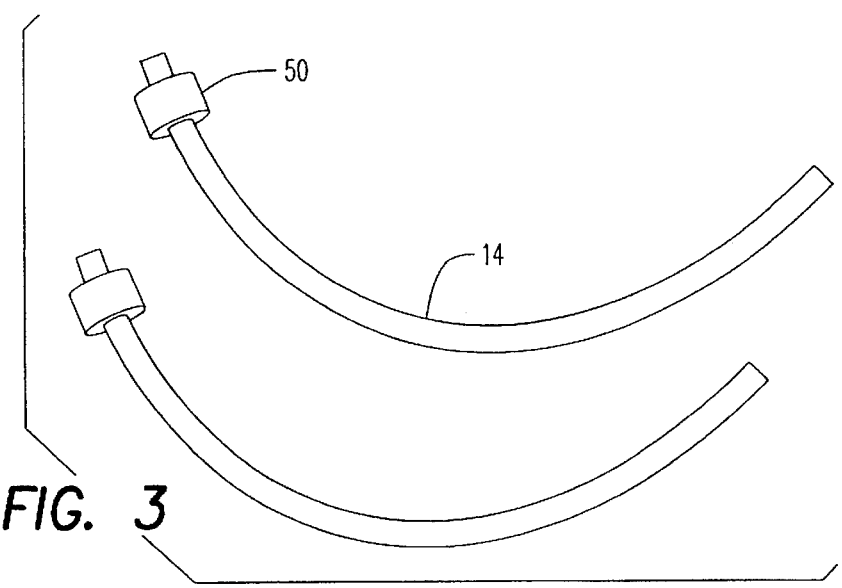
FIG. 3 is a plan view of the flexible filament line cutting members shown in FIG. 1.
Figure 4:
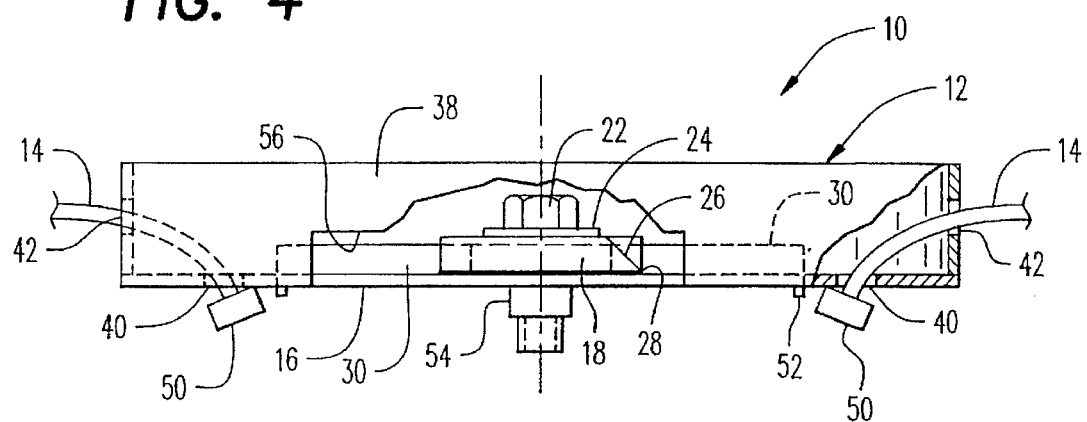
FIG. 4 is a fragmented view in the direction of arrows 4—4 in FIG. 2 with the filament line cutting members 14 installed.

At least two flexible filament line elements 14 are also provided, each of which include an enlarged boss or collar member 50 secured to one end thereof as best seen in FIG. 3. These filament lines 14 may be circular or preferably triangular in cross section and of well-known sufficient size and strength so as to slice through grass and other like vegetation when rotated rapidly about a central hub. A pair of aligned holes 40 and 42 are formed through plate 16 and ring 38, respectively, such that each filament line 14 may be fed through each of these holes 40 and 42 with collar 50 positioned against the plate 16 as seen in FIG. 4. When the device 10 is rotated about its central axis by the power lawn trimmer (not shown), the filament lines 14 will slice through and cut grass and other like vegetation in a grass trimming mode.

It should be understood that, although two opposing rigid blades 18 and two generally oppositely opposing filament lines 14 are provided, nonetheless so long as the entire arrangement is in rotational balance, the number of such cutting elements may be varied and intended to be within the scope of this invention.

As seen in FIG. 4, the device 10 may also be operated with both cutting members in operable position. That is to say, each of the flexible filament lines 14 may be installed and ready for use, while each of the rigid blades 18 may also be extended beyond the circular perimeter of the ring 38 to assist in grass trimming of heavier vegetation.

The invention 10 is shown in what applicant believes to be an optimal configuration for the support member 12. A circular perimeter of the plate 16 connected to the protective ring 38 provides that optimal strength. However, should individual support elements extend radially from a central flat hub member wherein portions of plate 16 are removed for weight reduction, such a device is also contemplated to be within the scope of this invention.

Figure 6:
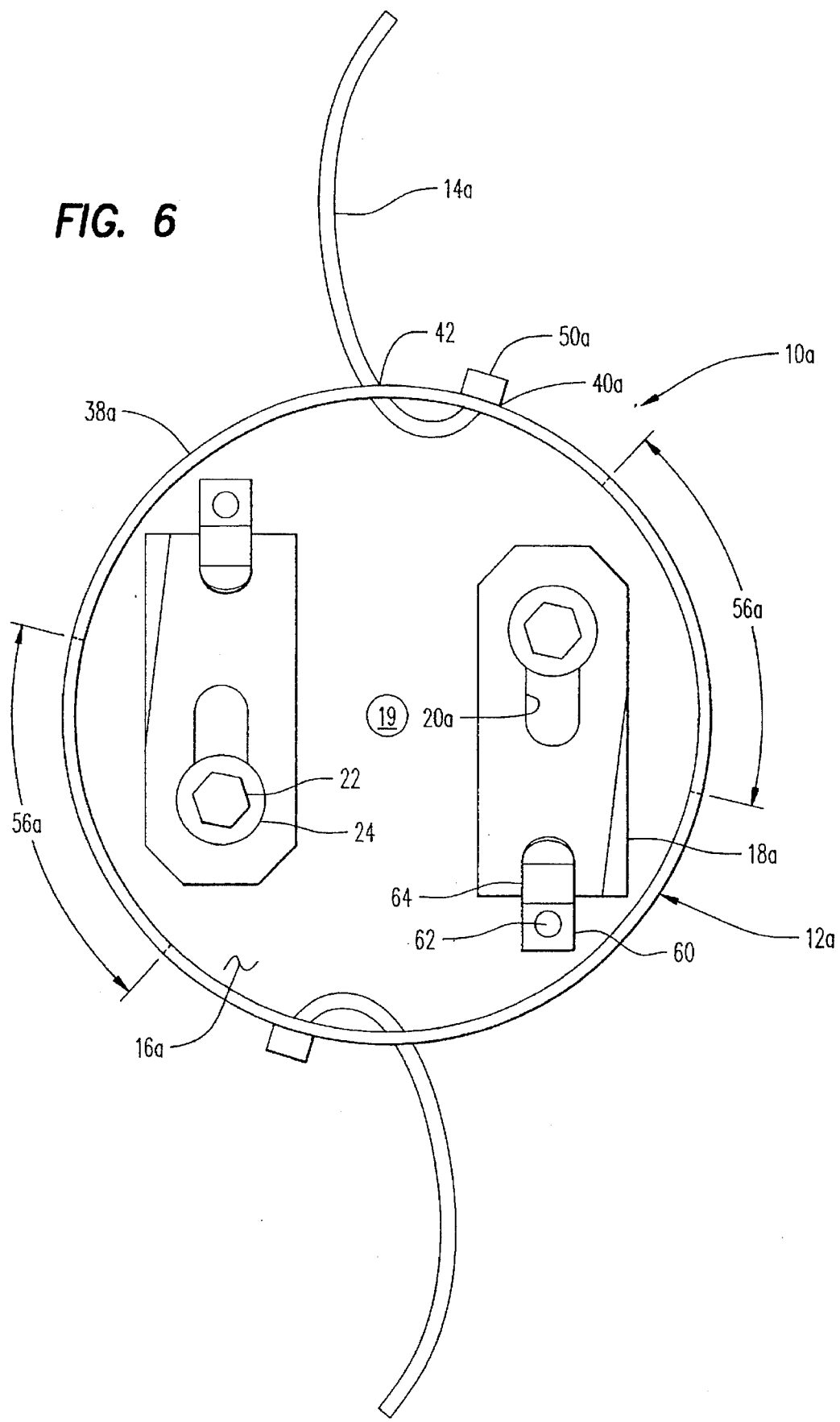
FIG. 6 is a bottom plan view of another embodiment of the invention showing the rigid blades (18a) in a stored configuration and the flexible filament lines (14a) in operable grass-cutting position.

Referring now to FIG. 6, the preferred embodiment of the invention is shown generally at numeral 10a and also includes a support member 12a, pivotally connected blades 18a, and flexible elongated filament line members 14a. The support member 12a is formed of rigid high-strength steel having a circular plate 16a and a cylindrical protecting ring 38a dependently connected in continuous fashion around the entire circular perimeter of plate 16a. A central mounting hole 19 is provided which facilitates mounting and driven engagement onto a rotary output shaft of a power lawn trimmer (not shown).

The rigid blades 18a are pivotally held through slot 20a by threaded fastener 22 against flat washer 24 into an internally threaded collar similar to 54 as best seen in FIGS. 4 and 5. The slots 20 are elongated, in conjunction with the selected diameter of threaded fasteners 22, so that each blade 18a may be moved inwardly and rotated about fastener 22 from the stored position shown in FIG. 6 to an un-use position similar to that shown in FIG. 2.

A formed spring clip 60 rigidly connected by rivet 62 to plate 16a serves as a retaining member for each rigid blade 18 in the stored position by contact of clip portion 64 against the end of the blade 18a as shown. Slots 56a are formed into the protecting ring 38a to facilitate back and forth positioning and support of each blade 18a between its stored and its in-use position.

The flexible line elements 14a, functioning independently of blades 18a for grass trimming and being removable, each include an enlarged end 50a formed of the filament line material itself when cut A pair of spaced holes 40a and 42 are formed through ring 38a such that each filament line 14a by heat may be fed through these holes 40a and 42a as shown with enlarged potion 50a positioned against the outer surface of hole 40a as shown. When the device 10a is rotated in use, the filament lines 14a slice through and cut grass and other like vegetation in a grass-trimming mode. When the rigid blades 18a are in an in-use position, these filament lines 14a may be easily removed.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A combination grass trimming and lawn edging device for a lawn trimmer having a rotary output shaft comprising:

a support member defining a generally circular perimeter and having a central mounting hole for operable connection to the output shaft, a rotational axis of the output shaft being generally orthogonally oriented to said support member;

a plurality of evenly spaced rigid blade means each pivotally connected to said support member and generally radially extending beyond said perimeter, said blade means for edging grass along a border thereof when the output shaft, is operated in a generally horizontal orientation;

a plurality of evenly spaced flexible filament line means each connectable at one end thereof to and generally radially extending beyond said perimeter, said filament line means for cutting grass and like vegetation when the output shaft is operated in a generally upright orientation;

means for selectively radially inwardly translating and rotatably retracting and retaining each said blade means into a stored position within said perimeter during operation of said device with said filament line means whereby grass may be cut only by each said filament line means.

2. A grass trimming and lawn edging device as set forth in claim further comprising:

means for selectively removing said filament line means whereby grass may be only edged by said blade means.

3. A combination grass trimming and lawn edging device for a lawn trimmer having a rotary output shaft comprising:

a generally flat disc-shaped support member defining a circular perimeter and having a central mounting hole for connecting said device to the output shaft, a rotational axis of the output shaft being orthogonally oriented to said support member, a cylindrical strengthening ring connected to said perimeter;

a plurality of evenly spaced rigid blade members each pivotally connected for free rotation to said support member;

each said blade member, when in an operative position, extending generally radially beyond said perimeter through a separate slot for each said blade member formed through said ring;

a plurality of evenly spaced flexible filament lines each including means for removable engagement of one end of each said filament line with evenly spaced apertures formed into said support member and said ring, said apertures also being evenly spaced from adjacent said blade members, each said filament line generally radially extending beyond said ring;

means for selectively radially inwardly translating and rotatably retracting and retaining said blade members in a stored position within said perimeter during operation of said device when said filament lines are in use.

4. A combination grass trimming and lawn edging device for a lawn trimmer having a rotary output shaft comprising:

a rigid support member having a central mounting hole for operable connection to the output shaft, a rotational axis of the output shaft being generally orthogonally oriented to said support member;

a first plurality of rigid blades each pivotally connected to said support member and being evenly spaced one to another and equally spaced radially from said mounting hole, said blades radially extending beyond an outer perimeter of said support member for edging grass along a border thereof when said blades are in an operative position;

a second plurality of elongated flexible filament lines each connectable adjacent one end thereof in evenly spaced arrangement one to another and to said blades adjacent to and generally radially extending beyond said perimeter, said filament lines for cutting grass and like vegetation when the output shaft is operated in a generally upright orientation;

means for selectively retracting each said blade into a stored position within said perimeter by slidable inward movement then rotational movement through about 90° of each said blade about the pivotal connection whereby only grass may be cut only by each said filament lines.

5. A grass trimming and lawn edging device as set forth in claim 4, further comprising:

means for selectively removing said filament lines whereby grass may be edged only by said blade means.

* * * * *